United States Patent [19]

Ryan et al.

[11] 4,068,563
[45] Jan. 17, 1978

[54] INTERNAL OIL SEAL FOR PISTON

[76] Inventors: Fred W. Ryan, P.O. Box 845, Seahurst, Wash. 98062; Robert J. Webber, 23633 101st W., Edmonds, Wash. 98020

[21] Appl. No.: 726,828

[22] Filed: Sept. 27, 1976

Related U.S. Application Data

[60] Division of Ser. No. 502,356, Sept. 3, 1974, Pat. No. 3,992,980, which is a continuation of Ser. No. 257,871, May 5, 1972, abandoned.

[51] Int. Cl.² .......................... F01B 31/10; F16J 1/04
[52] U.S. Cl. ........................................ 92/157; 92/208; 123/41.38
[58] Field of Search ........................ 92/157; 123/41.38

[56] References Cited

U.S. PATENT DOCUMENTS

| | | | |
|---|---|---|---|
| 1,942,887 | 1/1934 | Vanni | 123/41.38 |
| 2,046,196 | 6/1936 | Truxell, Jr. | 123/41.38 |
| 2,372,050 | 3/1945 | Frauenfelder et al. | 92/157 |
| 3,056,638 | 10/1962 | Houde | 92/157 |

FOREIGN PATENT DOCUMENTS 1,112,896  11/1955  France ........................ 123/41.38

*Primary Examiner*—Paul E. Maslousky
*Attorney, Agent, or Firm*—Seed, Berry, Vernon & Baynham

[57] ABSTRACT

A seal for use within the interior portions of a piston, primarily on a diesel engine which has a pressurized oil supply which is forced upwardly through the connecting rod and sprayed on to the upper portion of the piston. The seal substantially closes the area between the connecting rod and the interior sidewalls of the piston skirt. The oil is thus restricted in flow, building up pressure within the top portion of the piston and causing the oil to contact the upper interior portion for cooling the piston and further, forced to lubricate the bushings on the wrist pin.

1 Claim, 5 Drawing Figures

U.S. Patent
Jan. 17, 1978
4,068,563
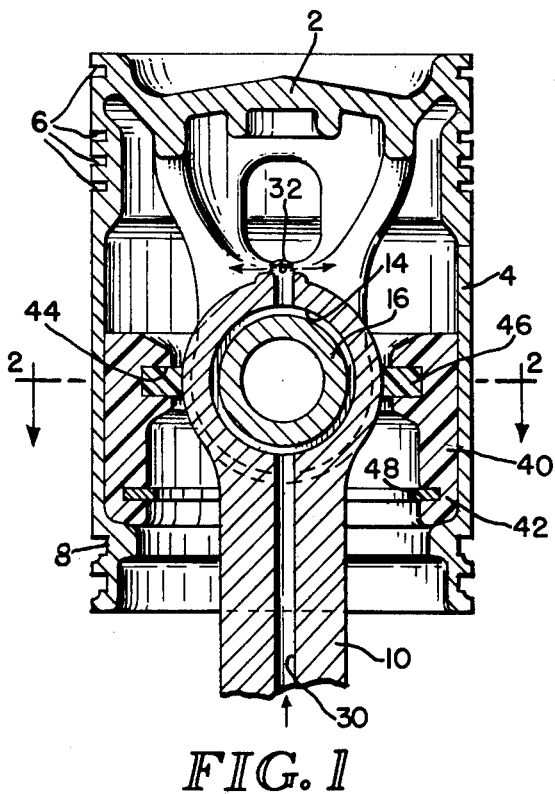
FIG. 1
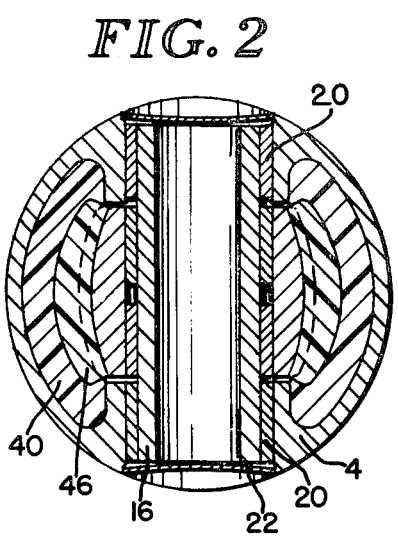
FIG. 2
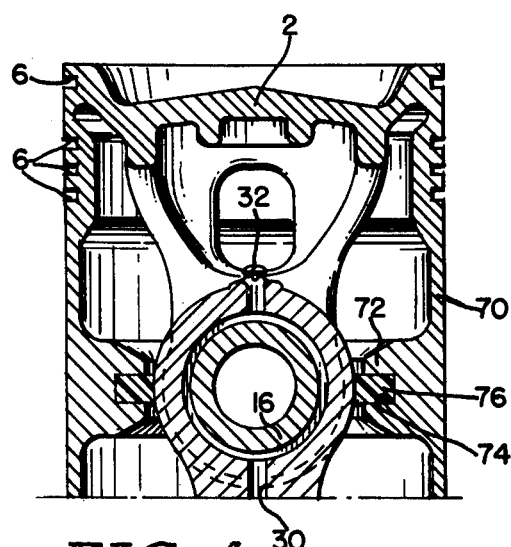
FIG. 4
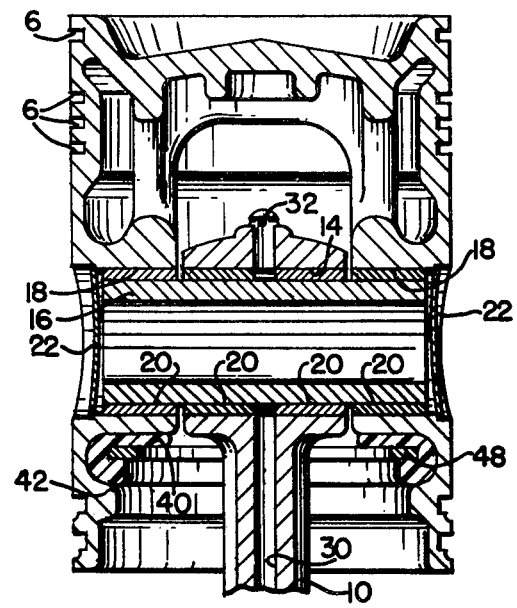
FIG. 3
FIG. 5

INTERNAL OIL SEAL FOR PISTON

This is a division of application Ser. No. 502,356, filed on Sept. 3, 1974, now U.S. Pat. No. 3,996,980, which is a continuation of Ser. No. 257,871 filed on May 5, 1972, now abandoned.

BACKGROUND OF THE INVENTION

A diesel engine is generally a long lived internal combustion engine because of the efficiencies inherent in such an engine. One of the problems, however, with the diesel engine is that the upper compression ring i.e. at the upper portion of the piston, is subject to failure because it is not properly cooled, thus causing distortion and uneven wear.

Another problem with the diesel engine is caused by the high compression of air in the cylinder (over 500 lbs. at 600 r.p.m.) to which fuel is injected. Ignition of the fuel and air mixture takes place producing power to move the piston down, at the end of the stroke, port and exhaust valves are open at the same time allowing exhaust of spent gases and scavenging of material within the cylinder. The exhaust valves then close and compression is begun repeating the cycle. Due to the short time between cycles, the piston has very little time to cool which can cause the top ring to start collapsing at the ends often causing total failure of the whole ring which is usually stuck in the ring groove. This failure of the ring causes hot gasses to reach other rings below the fire ring, lower the compression and cause the engine to smoke. With proper cooling by oil on the underside of the piston head most occurrences of this will be eliminated. Because of the continuous pressure, the bushing around the wrist pin, which holds the piston to the connecting rod, may be worn quite badly and still not generate noise. The absence of a tell tale noise is a result of the fact that the piston is continuously forced downwardly against the upper portion of the wrist pin regardless of the amount of wear. It will be immediately apparent that if there is no obvious indication of wear upon the bushings or on the wrist pin the first notice that the operator will have of a worn wrist pin or bushing is when there is the ultimate failure which could permanently damage the engine.

Various attempts have been made to alleviate the problems hereinabove noted and one of particular note is the U.S. Pat. No. 2,092,599 granted to W. E. Brill on Sept. 7, 1937. Whereas Brill teaches the broad concept of retaining the lubricating fluid in the upper portion of the piston to provide cooling and lubrication thereby his apparatus requires a major modification to the piston itself. The bores 20 must be placed within the skirt and the shroud or baffle 13 must be secured to the interior of the piston by means of bolts or the like. Further, the retention of fluid above the baffle 13 does not assist in the lubrication of the wrist pin as will be obvious when viewing FIGS. 1 or 3.

With the above noted problems and the known prior art attempt in mind it is an object of the present invention to provide an easily installed seal for use in the interior of a piston for an internal combustion engine. The seal is designed to retain lubricating oil above said seal and thus assure proper cooling of the upper portion of the piston.

Another object of the present invention is to provide a seal for use in the interior of a piston which causes a buildup of pressure in the upper portion of the piston thus forcing lubricant to the bushings surrounding the wrist pin and provide proper lubrication thereto.

It is yet another object of the present invention to provide a seal for use in the interior portion of a piston for an internal combustion engine wherein said seal is a kit which may be applied to the interior of the piston during an overhaul of the engine. Said kit requiring no alteration to the interior of the piston to assure proper retention and placement.

BRIEF DESCRIPTION OF THE DRAWINGS

FIG. 1 is a vertical, sectional view of an engine piston assembly transverse to the axis of the wrist pin.

FIG. 2 is a transverse section of an engine piston looking upwardly into the piston along lines 2—2 of FIG. 1.

FIG. 3 is a vertical section of a piston assembly taken at right angles to the section of FIG. 1.

FIG. 4 is a partial view of the interior of a piston showing another possible method for sealing the interior of the piston.

FIG. 5 is a vertical section through a piston typical to a gasoline engine looking along the axis of the piston pin.

DETAILED DESCRIPTION OF THE DRAWINGS

As seen in FIGS. 1 through 3, a piston adapted to receive the present invention is shown and comprises a piston head 2, piston skirt 4, a plurality of compression ring grooves 6 about the outer periphery of the upper portion of the piston skirt and a pair of oil ring grooves 8 around the lower portion of said skirt. The piston is mounted for reciprocatory motion within a cylinder (not shown) and is held in position by means of a connecting rod 10 which has at its upper portion a bulbous section 12 having a bore 14 therethrough to receive a piston or wrist pin 16 therein. The piston pin 16 extends through the upper portion of the connecting rod and outwardly thereof to be mated in a pair of bores 18 extending through the skirt of the piston.

The areas of contact between the piston and the piston pin as well as the connecting rod and the piston pin are shielded by a plurality of bushings 20 to prevent excessive wear. It is to be understood that the bushings 20 are circumferential in nature and cylindrical in structure, adapted to contact the entire periphery of the piston pin. The bores 18 in the sidewalls of the piston extend through the entire wall and the piston pin is held in place by a piston pin retainer 22 which serves not only to retain the piston in position but likewise serves to seal the interior of the piston from the cylinder wall.

The lubricating and cooling fluid is supplied to the upper portion of the piston by means of lubrication bore 30 which extends upwardly through the rod. The fluid is sprayed into the interior of the piston by means of a nozzle 32. It is to be noted at this point that the bushings 20 are separate entities. The two bushings which provide a bearing surface between the rod 10 and wrist pin 16 are separated such that the fluid which proceeds upwardly through the bore 30 may pass around the wrist pin and thence out the nozzle 32.

As best seen in FIG. 3, the bushings 20 which provide a bearing surface between the skirt 4 of the piston likewise are spaced from the bushings 20 which provide a bearing surface between the rod and the wrist pin and as will be described in greater detail hereinafter provide the means by which the lubricating and cooling fluid will again be returned to the supply.

Referring now in particular to FIG. 1 the seal itself may be seen in its preferred form. As shown in this view the seal is a kit item which may be placed in a piston during an overhaul and comprises a base member 40 which is molded of a Nylon or other suitable material to conform to the interior surface of the skirt and rest upon the inwardly protruding shoulder 42. The base member 40 extends upwardly along the interior of the skirt to a point approximately opposite the axis of the wrist pin whereat it extends radially outwardly i.e. towards the wrist pin and has formed therein a groove 44. The groove 44 is adapted to receive a wiping seal 46 which may be fabricated of silicone rubber or other suitable material and is in contact with the exterior surface of the bulbous portion 12 of the rod 10.

As seen in FIG. 2 the seal base portion 40 together with the particular sealing surface 46 essentially close the entire area around the sides of the portion 12 of the rod 10, extending between that portion and the interior surface of the skirt of the piston itself.

Referring now again to FIG. 3 it can be seen that the lower portion of the main body 40 extends around the entire circumference of the interior of the piston and thus provides a firm base since it abuts the top surface of the shoulder 42 and rests thereupon around its entire periphery. When the seal is provided in a kit form it is to be understood that the base portion 40 will probably be provided in segments, the particular number being a matter of design such that they will be easily placed in position around the periphery. The base portion 40 of the seal is held in position within the piston by means of a snap ring 48 which when in place abutting the interior of base portion 40 exerts a continual outward pressure upon the base portion.

As can be seen in FIG. 4, for original equipment manufacture, the piston could be cast with an internal groove to hold the seal thus accomplishing the same purpose as with the above described kit. As seen in this Fig. the skirt 70 has upon its interior surface at the area whereat it will be proximate to the bulbous portion of the piston rod and inwardly projecting lip 72 having a rectangular groove 74 therein. The groove 74 is adapted to frictionally receive a seal 76 which as described hereinabove with regard to FIGS. 1 through 3 will wipe the bulbous portion of the piston rod and thus retain the lubricant above said seal. It is to be understood that with machining to close tolerance this embodiment could be used without the separate seal 76.

Referring now in particular to FIG. 5 it could be seen that an identical concept may be used in a gasoline engine and it can be seen in this view that the piston has a head portion 50 and a skirt 52 as well as compression rings 54 and an oil ring 56. For this design of a piston the problems are not as complex in that the piston is designed to function under different circumstances subject to different stresses. The assembly still includes a connecting rod 58 terminating in a bulbous upper portion 60 which is adapted to receive a piston or ring pin 62 therein. In order to retain cooling and lubricating fluid in a position above the wrist pin 62 a cone shaped seal 64 which may be fabricated of any suitable material is placed such that it abuts the lower portion of the interior surface of the piston itself and rests upon the upper portion of the piston rod 58. In this particular case because of the difference in configuration the seal 64 is provided with a plurality of openings 66 such that the lubricant and cooling fluid may escape back to the source.

As can be seen the present invention provides a simple, inexpensive and economical means for retaining a fluid in a position high within the piston itself for both diesel and gasoline driven reciprocating engines thus providing a cooling medium reducing the distortion, absorb heat and provide lubricant to the bushings which hold the respective parts in bearing contact. The seal may be provided as a part of the original equipment or as in the preferred embodiment may be supplied in kit form for use in the aftermarket.

The embodiments of the invention in which an exclusive property or privilege is claimed are defined as follows:

1. In a hollow piston and connecting rod assembly for use in an internal combustion engine wherein the piston includes a head, a cylindrical skirt extending from the head and a pair of diametrically opposed, transverse bores extending through the skirt of the piston, wherein a connecting rod has a passageway therethrough for passage of lubricant and a bulbous portion at one end through which a bore extends, wherein a wrist pin extends through the bore of the connecting rod and is supported in the diametrically opposed bores of the piston, wherein inner bushing means are inserted in the bore of the connecting rod around the wrist pin, providing bearing surfaces between the inner surfaces of the bushing means and the wrist pin, wherein outer bushings are inserted in the bore extending through the skirt of the piston and around the wrist pin to provide bearing surfaces between inner surfaces of the outer bushings and the wrist pin, the outer bushings spaced from terminating ends of the inner bushing means to provide lubricant passages so that lubricant forced under pressure through the passageway in the connecting rod lubricates the wrist pin and cools the piston head, the improvement comprising:

sealing means, including inwardly projecting lips extending from the interior surface of the skirt and integral therewith disposed opposite the axis of the wrist pin and on each side thereof, a groove formed in the portion of each of the lips facing the wrist pin, and a wiping seal received in each of the grooves contacting the exterior surface of the bulbous portion of the connecting rod, the inwardly projected lips and wiping seals closing the entire area between the bulbous portion of the connecting rod and the interior surface of the skirt of the piston so that the lubricant forced through the passageway in the connecting rod beneath the piston head and above the connecting rod builds up pressure therein, the lubricant forced to return below the sealing means substantially only along the bearing surfaces between the inner and outer bushings and wrist pin to provide continuous lubrication thereto.

* * * * *